(12) United States Patent
Hu et al.

(10) Patent No.: US 6,965,175 B2
(45) Date of Patent: Nov. 15, 2005

(54) DYNAMIC TEMPERATURE CONTROL METHOD FOR A COMPUTER SYSTEM

(75) Inventors: Ming-Chuan Hu, Junghe (TW); Hung-Hsun Wei, Jungli (TW)

(73) Assignee: Quanta Computer Inc., Tao Yuan Shien (TW)

( * ) Notice: Subject to any disclaimer, the term of this patent is extended or adjusted under 35 U.S.C. 154(b) by 266 days.

(21) Appl. No.: 10/244,887

(22) Filed: Sep. 16, 2002

(65) Prior Publication Data
US 2003/0230939 A1 Dec. 18, 2003

(51) Int. Cl.[7] .............................................. H02J 1/00
(52) U.S. Cl. ....................................... 307/152; 361/687
(58) Field of Search ..................... 361/687; 700/299, 700/300; 713/300, 322, 330, 340, 323; 318/471, 318/472; 702/132; 307/152

(56) References Cited

U.S. PATENT DOCUMENTS

| | | | |
|---|---|---|---|
| 5,929,581 A * | 7/1999 | Van Brocklin et al. ..... | 318/471 |
| 6,167,330 A * | 12/2000 | Linderman ................... | 700/295 |
| 6,182,232 B1 * | 1/2001 | Klein .......................... | 713/340 |
| 6,304,978 B1 * | 10/2001 | Horigan et al. ............. | 713/322 |
| 6,349,269 B1 * | 2/2002 | Wallace, Jr. ................ | 702/132 |
| 6,415,388 B1 * | 7/2002 | Browning et al. .......... | 713/322 |
| 6,496,118 B1 * | 12/2002 | Smith ......................... | 340/584 |
| 6,510,400 B1 * | 1/2003 | Moriyama ................... | 702/132 |
| 6,735,499 B2 * | 5/2004 | Ohki et al. .................. | 700/299 |

FOREIGN PATENT DOCUMENTS

| | | | |
|---|---|---|---|
| TW | 420326 | 1/1990 | ............. G06F 1/20 |
| TW | 424174 | 3/1990 | ............. G06F 1/20 |

* cited by examiner

*Primary Examiner*—Robert L. Deberadinis
(74) *Attorney, Agent, or Firm*—Thomas, Kayden, Horstemeyer & Risley

(57) ABSTRACT

A dynamic temperature control method for a computer. The present invention monitors the power consumption and temperature of a microprocessor to set the rotation speed of a fan module at an appropriate speed such that noise generated and overheating are reduced.

16 Claims, 2 Drawing Sheets

# DYNAMIC TEMPERATURE CONTROL METHOD FOR A COMPUTER SYSTEM

BACKGROUND OF THE INVENTION

Field of the Invention

The present invention relates to a method of dynamic temperature control for a computer system. Specifically, it relates to a dynamic control method of reducing temperature of the computer system and noise of a fan module using the consumed power of the CPU as a parameter while monitoring the temperature of the CPU to control the fan module such that the computer system can work at acceptable temperatures and noise generated by the fan module is reduced.

Notebook computers are popular with the public due to their features of light weight and portability. Notebook computers are not a reduced-function auxiliary apparatus as before, but a powerful computing apparatus which can execute complex tasks independently. However, the notebook computer is still expensive, and thus reducing the cost of the notebook computer has become a key issue. Generally CPUs for desktop computers are used to replace CPUs for the notebook computers, thereby reducing the cost and selling price of notebook computers and allowing performance of notebook computers to equal that of the desktop computers. However, notebook computers installed with desktop CPUs are subject to problems of high temperature and excessive noise.

Several methods have been provided to control CPU temperature. Taiwan patent NO. 292,766 discloses an apparatus to control the CPU temperature. The apparatus is provided close to the CPU such as on the bottom of the CPU, to detect CPU temperature periodically. In the Taiwan patent, the fan module and cooling device (cooler) in a system are not activated if the CPU temperature is below a threshold temperature. If the CPU temperature reaches the threshold temperature, the fan module and cooling device are activated. After being activated, the output power of the cooling device increases gradually and continuously from zero. The output power (rotation speed) of the fan module gradually increases to full power if the CPU temperature is within the required temperature range.

The foregoing method has several disadvantages, such as difficulty in determining temperature parameters, since temperature changes corresponding to the change in power consumed by the CPU, and thus the method cannot cool the CPU (or system) in time, and is neither accurate nor sensitive. If the fan module or cooler operates at high power output, noise is generated. Replacing aluminum fans with copper fans can solve this. The dissipating (cooling) ability of copper is better than aluminum, but the copper fan is heavier and results in some problems such as increasing the weight of computer and deforming the motherboard.

SUMMARY OF THE INVENTION

An object of the present invention is to provide a method to control the temperature of a computer system accurately by a fan module, and set the rotation speed of the fan module appropriately to avoid noise and vibration.

Another object of the present invention is to provide a dynamic control method for resolving heat dissipation problems of a desktop CPU in a notebook computer, thereby achieving the object of replacing a notebook CPU with a desktop CPU.

To achieve the present objects, the invention discloses a dynamic control method for a computer system comprising the following steps.

First, the CPU is monitored to obtain a temperature parameter value and a power parameter value. Second, the temperature parameter value and a predetermined temperature initial value, temperature maximum value and temperature minimum value are all compared, as are power parameter value, a predetermined power initial value, and power setup value to obtain a temperature variation rate and a power variation rate. Then, the heat-dissipation module is rough-tuned if the temperature parameter value is between the temperature maximum value and the temperature minimum value, the power parameter value is greater than or equal to the power setup value, and the temperature variation rate is greater than a maximum temperature variation rate; the dissipation module is fine-tuned if the temperature variation rate is below or equal to the maximum temperature variation rate and the power variation rate is greater than a maximum power variation rate. Finally, the temperature parameter value and the power parameter value are stored to replace the temperature initial value and the power initial value and monitoring resumes.

BRIEF DESCRIPTION OF THE DRAWINGS

The present invention can be more fully understood by reading the subsequent detailed description in conjunction with the examples and references made to the accompanying drawings, to expand as follows.

DETAILED DESCRIPTION OF THE INVENTION

The present invention discloses a dynamic temperature control method for a computer system. The computer system comprises a microprocessor, a microcontroller, and a heat-dissipation module. Some specific parameters relating to temperature, power, tuning control and others, are predetermined and set in the microcontroller. The microprocessor can be a CPU, the microcontroller can be Embedded Controller (EC), Keyboard Controller (KBC) or others, and the heat-dissipation module can be a fan module or a cooling apparatus.

Figure 1A:
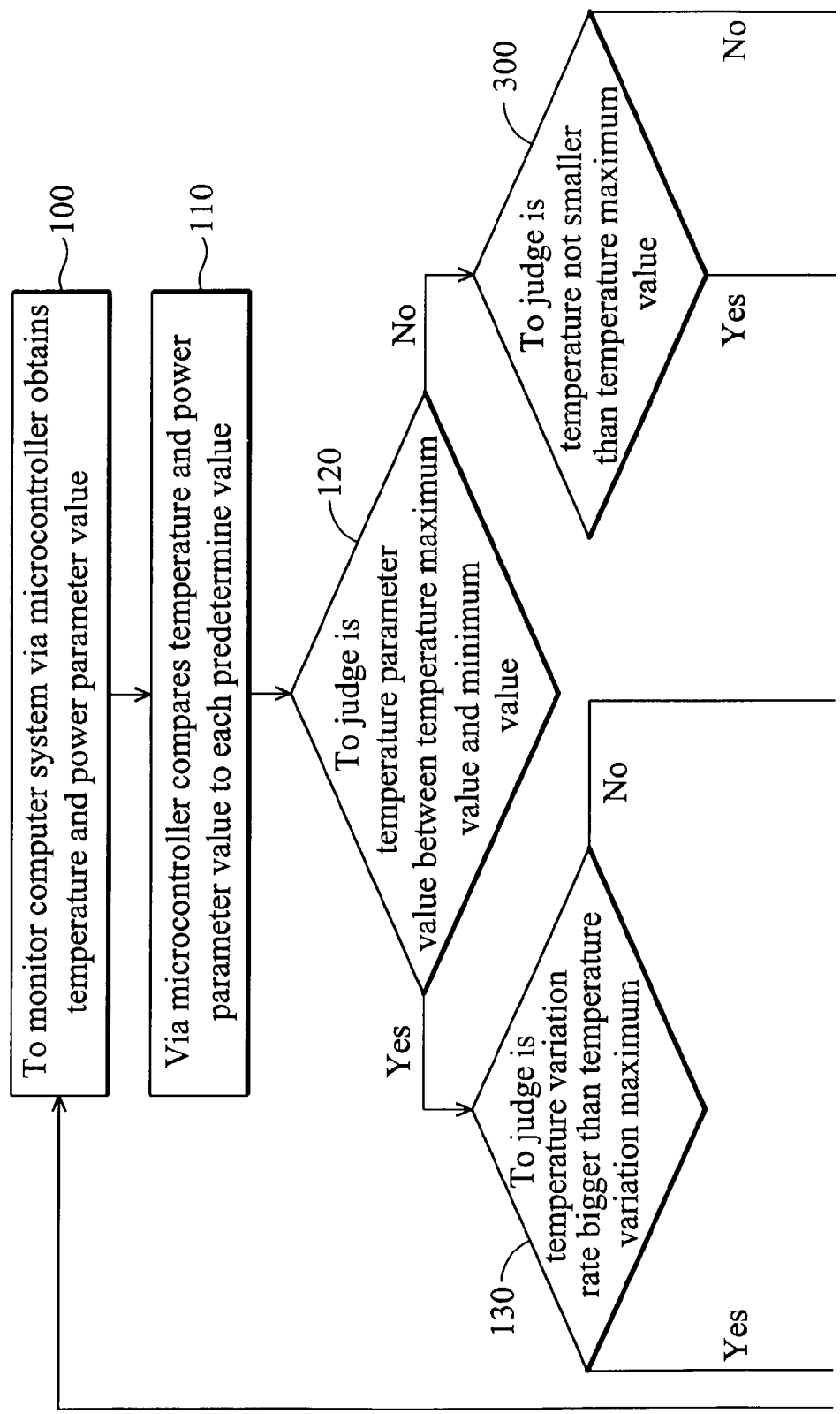
FIG. 1a–1b is a flowchart of the present embodiment.
Figure 1B:
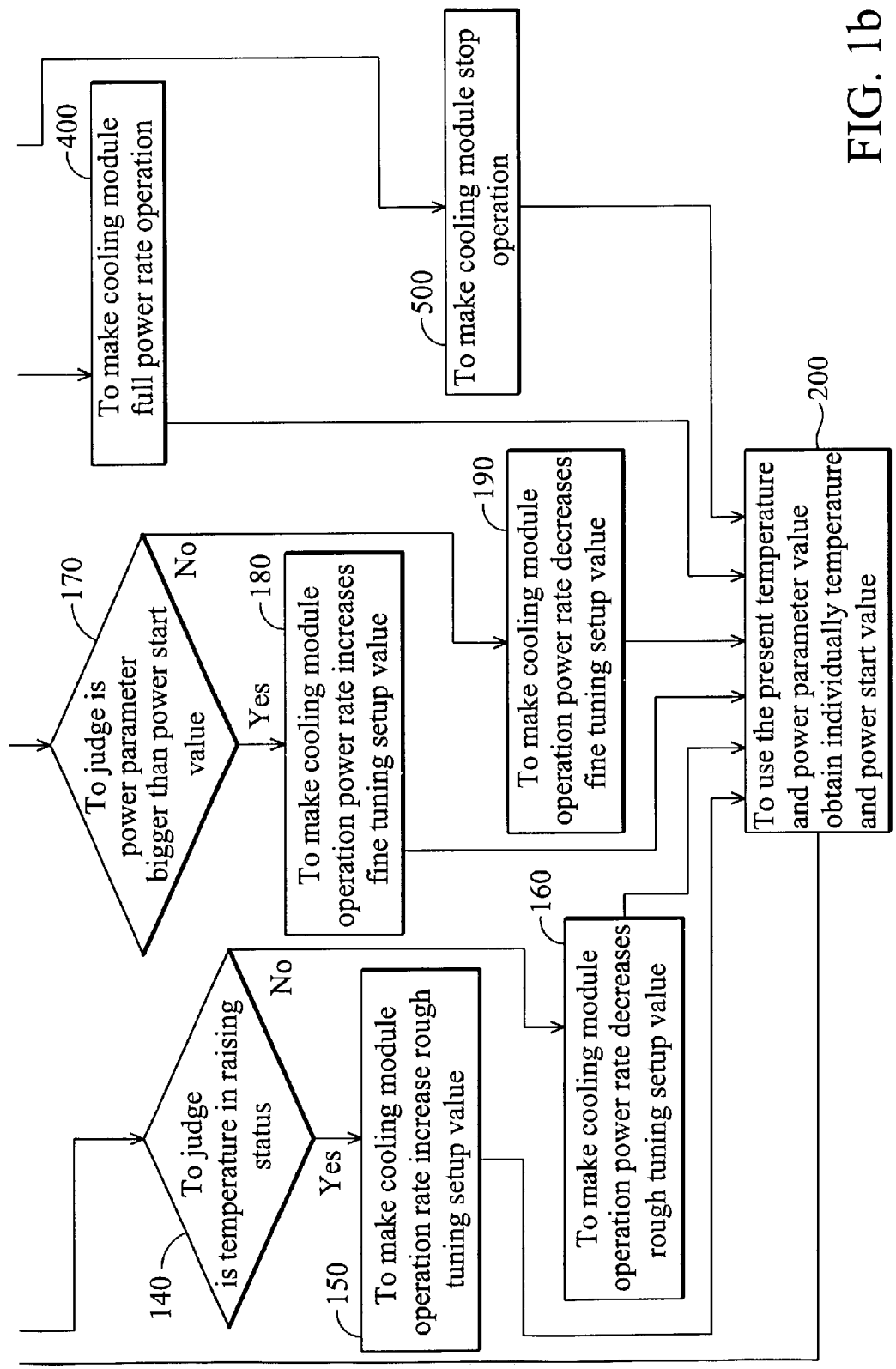

According to FIG. 1, the present invention discloses a method of dynamic temperature control for a computer system comprising the following steps.

(Step 100) The computer system is monitored by the microcontroller, including the temperature and power of the microprocessor, to obtain a temperature parameter value and a power parameter value. The clock throttling-ratio status, temperature parameter value and power parameter value of the microprocessor are obtained, and power parameter value is obtained by monitoring the power consumption of the computer system during a specific time period. To obtain the temperature parameter value, a temperature sensing device monitors the microprocessor and outputs a temperature sensing signal. The temperature sensing signal is received and transformed by the microcontroller to obtain the temperature parameter value. The temperature sensing device can be a thermal diode or thermometer, and can be disposed in or around the microprocessor to measure temperature.

To obtain the power parameter value, the analog current signal and/or analog voltage signal of the computer are monitored and output to the microcontroller. The microcontroller converts the analog current signal and/or the analog voltage signal, thereby obtaining the corresponding digital parameter. The analog current and/or voltage signals correspond to the current and/or voltage consumed by the computer system, the microprocessor. The digital parameter can be the voltage or current parameter values of the computer system, or the current parameter value of the microprocessor or the CPU. The voltage parameter of the microprocessor often has a fixed value, and thus the power consumed can be measured by multiplying the voltage parameter value and the current parameter value of the computer system, or multiplying the voltage parameter value and the current parameter value of the microprocessor. Thus, a plurality of consumed power values are obtained, sampled, and averaged, thereby obtaining the power parameter value. Sample and average values eliminate surge influence on the current and voltage. The calculation for the power parameter value can be performed by the microcontroller and stored therein.

For monitoring the power consumption of the computer system, four possible methods are provided as follows, but are not limited thereto.

(Method 1) A voltage-monitoring circuit is further provided to measure the voltage value of the computer system, such as battery voltage and the voltage of an external power source. Also a current-monitoring circuit is provided to measure the current value of the computer system. The measured current and voltage values are transmitted to the microcontroller for further processing. Thus, the power consumption of the computer system is obtained by measuring the voltage and current values.

(Method 2) The operating voltage of the microprocessor often has a fixed value, and thus the power consumed can be measured by the current value of the microprocessor and CPU through an additional monitoring circuit.

(Method 3) When a computer system is battery-powered, power consumption is monitored and controlled. Thus, the current and voltage supplied by the batteries can be detected by the microcontroller through the System Management Bus (SMB) in the computer system, thereby measuring the power consumption. In addition, the microcontroller can measure the average current and voltage supplied by the batteries, thereby reducing the sampling rate for monitoring.

(Method 4) When a computer system is battery-powered, the voltage of the batteries merely changes slightly in a short period. Thus, the current supplied by the batteries can be detected by the microcontroller through the system management bus (SMB), thereby measuring the power consumed.

(Step 110) The temperature parameter value and a predetermined temperature initial value, temperature maximum value and temperature minimum value are all compared by the microcontroller, as are the power parameter value and a predetermined power initial value, and power setup value. After calculation, a temperature variation rate and a power variation rate are obtained, and step 120 is carried out.

(Step 120) The microcontroller adjusts the operating power of the heat-dissipation module in accordance with the clock throttling-ratio status, the temperature variation rate, and the power variation rate. If the temperature parameter value (for example 70° C.) is between the temperature maximum value (for example 95° C.) and the temperature minimum value (for example 50° C.), and the power parameter value is greater than or equal to the power setup value, then step 130 is carried out. Otherwise, if the temperature parameter value is not below the temperature maximum value or not greater than the temperature minimum value, then step 300 is carried out.

(Step 130) If the temperature parameter value is between the temperature maximum value and the temperature minimum value, and the power parameter value is greater than or equal to the power setup value, the microcontroller rough-tunes the heat-dissipation module according to a predetermined maximum temperature variation rate, thereby increasing the operating power of the heat-dissipation module by the rough-tuning setup value (for example 10%). If the temperature variation rate is greater than the maximum temperature variation rate, then step 140 is carried out. Otherwise, if the temperature variation rate is below or equal to the maximum temperature variation rate, then step 170 is carried out.

(Step 140) If the temperature variation rate is greater than the maximum temperature variation rate and the temperature parameter value is greater than the temperature initial value, then step 150 is carried out. Otherwise, if the temperature parameter value is below the temperature initial value, step 160 is executed.

(Step 150) If the temperature parameter value is greater than the temperature initial value, the microcontroller rough-tunes the heat-dissipation module to increase the operating power of the heat-dissipation module by the rough-tuning setup value (for example 10%). Then, step 200 is carried out.

(Step 160) If the temperature parameter value is below the temperature initial value, the microcontroller rough-tunes the heat-dissipation module to decrease the operating power of the heat-dissipation module by the rough-tuning setup value (for example 10%). Then, step 200 is carried out.

(Step 170) If the temperature variation rate is below or equal to the maximum temperature variation rate, the microcontroller fine-tunes the heat-dissipation module according to a predetermined maximum power variation rate and a predetermined fine-tuning setup value (for example 1%). If the power variation rate is greater than the maximum power variation rate and the power parameter value is greater than the power initial value, step 180 is executed. Otherwise, if the power variation rate is greater than the maximum power variation rate and the power parameter value is below the power initial value, step 190 is executed.

(Step 180) If the power variation rate is greater than the maximum power variation rate and the power parameter value is greater than the power initial value, the microcontroller fine-tunes the heat-dissipation module to increase the operating power of the heat-dissipation module by the fine-tuning setup value (for example 1%). Then, step 200 is executed.

(Step 190) If the power variation rate is greater than the maximum power variation rate and the power parameter value is below the power initial value, the microcontroller fine-tunes the heat-dissipation module to decrease the operating power of the heat-dissipation module by the fine-tuning setup value (for example 1%). Then, step 200 is executed.

(Step 200) The microcontroller stores the temperature parameter value and power parameter value as the temperature initial value and the power initial value respectively, and then repeats step 100.

(Step 300) If the temperature parameter value is not below the temperature maximum value or not greater than the temperature minimum value, and if the temperature parameter value (for example 100° C.) is greater than or equal to the temperature maximum value (for example 95° C.) then step 400 is executed. Otherwise, if the temperature parameter value (for example 40° C.) is below the temperature minimum value (for example 50° C.) then step 500 is executed.

(Step 400) If the temperature parameter value is greater than or equal to the temperature maximum value, the microcontroller operates the heat-dissipation module at full power and sets the clock throttling-ration status to an on-state ('Throttle On') to reduce the clock throttling-ratio of the microprocessor, and then step 200 is executed.

(step 500) If the temperature parameter value is below the temperature minimum value, the microcontroller shuts down the heat-dissipation module, and then step 200 is executed.

As described above, the microcontroller rough-tunes the operating power of the heat-dissipation module according to the measured temperature of the CPU. Also the microcontroller fine-tunes the operating power of the heat-dissipation module according to the power consumed by the CPU. Thus the temperature of the computer system can be dynamically controlled and balanced. The rough-tuning setup value must be greater than the fine-tuning setup value. For example, the rough-tuning setup value can be set as 10% or 20% of the full power of the heat-dissipation module, and the fine-tuning setup value can be set as 1% or 5% of the full power of the heat-dissipation module.

In addition, the power consumption of a fan module (heat-dissipation module) corresponds to the rotation speed of the fan module. Thus adjusting the operating power (or the consumed power) of the fan module is equivalent to adjusting the rotation speed of the fan module. If the fan module rotates at high speed without dynamic control, excessive noise is always generated. Using the dynamic temperature control method of the present invention can provide temperature and noise control.

Consequently, according to the dynamic temperature control method of present invention, if the computer system is overheated, rough-tuning is performed to rapidly lower the system temperature to a reasonable range. For example if the temperature is greater than 40° C., the heat-dissipation module is activated, and operates under 40% full power; when temperature is greater than 50° C., the heat-dissipation module operates under 50% full power. If the computer system works in a normal state (i.e., not overheated), the consumed power of the CPU is monitored and the operating power of the heat-dissipation module is finely tuned to keep the temperature at a dynamic balance.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dynamic temperature control method for a computer system which has at least a CPU, a microcontroller and a fan module, the method comprising the steps of:

monitoring the microprocessor by the microcontroller to obtain a clock throttling-ratio status, a temperature parameter value and a power parameter value;

comparing the temperature parameter value and a predetermined temperature initial value, temperature maximum value and temperature minimum value by the microcontroller, and comparing the power parameter value and a predetermined power initial value, and power setup value by the microcontroller to obtain a temperature variation rate and a power variation rate;

if the temperature parameter value is between the temperature maximum value and the temperature minimum value, and the power parameter value is greater than or equal to the power setup value, the microcontroller rough-tunes the operating power of the fan module according to a predetermined maximum temperature variation rate and a rough-tuning setup value;

if the temperature variation rate is below or equal to the maximum temperature variation rate, the microcontroller fine-tuning the operating power of the fan module according to a predetermined maximum power variation rate and a fine-tuning setup value;

if the power variation rate is greater than the maximum power variation rate, and the power parameter value is below the power initial value, the microcontroller adjusting the fan module to reduce the operating power by the fine-tuning setup value; and storing the temperature parameter value and the power parameter value as the temperature initial value and the power initial value.

2. The dynamic temperature control method as claimed in claim 1, wherein rough-tuning the operating power of the fan module further comprises, if the temperature variation rate is greater than the maximum temperature variation rate, and the temperature parameter value is greater than the temperature initial value, the microcontroller adjusting the fan module to increase the operating power by the rough-tuning setup value.

3. The dynamic temperature control method as claimed in claim 1, wherein rough-tuning the operating power of the fan module further comprises, if the temperature variation rate is greater than the maximum temperature variation rate, and the temperature parameter value is below the temperature initial value, the microcontroller adjusting the fan module to reduce the operating power by the rough-tuning setup value.

4. The dynamic temperature control method as claimed in claim 1, wherein fine-tuning the operating power of the fan module further comprises, if the power variation rate is greater than the maximum power variation rate, and the power parameter value is greater than the power initial value, the microcontroller adjusting the fan module to increase the operating power by the fine-tuning setup value.

5. The dynamic temperature control method as claimed in claim 1, wherein adjusting the operating power of the fan module by the microcontroller further comprises, if the clock throttling-ratio status is off, and the temperature parameter value is greater than or equal to the temperature maximum value, the microprocessor operating the fan module at full power, reducing a clock throttling-ratio of the microprocessor, and setting the clock throttling-ratio status on.

6. The dynamic temperature control method as claimed in claim 1, wherein adjusting the operating power of the fan module by the microcontroller further comprises, if the temperature parameter value is below the temperature minimum value, the microcontroller stopping the operation of the fan module.

7. The dynamic temperature control method as claimed in claim 1, wherein monitoring the microprocessor to obtain the temperature parameter value comprises the steps of:

using a temperature sensing device in the computer system to monitor the microprocessor and output a temperature sensing signal; and measuring and transforming the temperature sensing signal by the microcontroller to obtain the temperature parameter value.

8. The dynamic temperature control method as claimed in claim 7, wherein the temperature sensing device is a thermal diode.

9. The dynamic temperature control method as claimed in claim 1, wherein monitoring the microprocessor to obtain the power parameter value comprises the steps of:

using a current monitoring circuit additionally provided to the computer system to momtor a current signal of the microprocessor; and measuring and transforming the current signal of the microprocessor by the microcontroller to obtain the power parameter value.

10. A dynamic temperature control method for a computer system which has a microprocessor, a microcontroller and a heat-dissipation module, the method comprising the steps of:

monitoring the computer system by the microcontroller to obtain a temperature parameter value and a power parameter value;

comparing the temperature parameter value with a predetermined temperature initial value, temperature maximum value and temperature minimum value by the microcontroller, and comparing the power parameter value with a predetermined power initial value and power setup value by the microcontroller to obtain a temperature variation rate and a power variation rate;

rough-tuning the operating power of the heat-dissipation module by the microcontroller according to a predetermined rough-tuning setup value, if the temperature parameter value is between the temperature maximum value and the temperature minimum value, the power parameter value is greater than or equal to the power setup value, and the temperature variation rate is greater than a predetermined maximum temperature variation rate;

if the temperature parameter value is below temperature initial value, the microcontroller adjusting the heat-dissipation module to decrease the operating power by the rough-tuning setup value; and saving the temperature parameter value and the power parameter value as the temperature initial value and the power initial value.

11. The dynamic temperature control method as claimed in claim 10, wherein rough-tuning the operating power of the heat-dissipation module further comprises, if the temperature parameter value is greater than temperature initial value, the microcontroller adjusting the heat-dissipation module to increase the operating power by the rough-tuning setup value.

12. The dynamic temperature control method as claimed in claim 10, wherein rough-tuning the operating power of the heat-dissipation module further comprises, if the temperature variation rate is below or equal to the maximum temperature variation rate, and the power variation rate is greater than a predetermined maximum power variation rate, the microcontroller fine-tuning the operating power of the heat-dissipation module according to a predetermined fine-tuning setup value.

13. The dynamic temperature control method as claimed in claim 12, wherein fine-tuning the operating power of the heat-dissipation module further comprises, if the power variation value is greater than the power initial value, the microcontroller adjusting the heat-dissipation module to increase the operating power by the fine-tuning setup value.

14. The dynamic temperature control method as claimed in claim 12, wherein fine-tuning the operating power of the fan module further comprises, if the power parameter is below the power initial value, the microcontroller adjusting the heat-dissipation module to decrease the operating power by the fine-tuning setup value.

15. The dynamic temperature control method as claimed in claim 10, wherein before rough-tuning the operating power of the heat-dissipation module, if the temperature parameter value is greater than or equal to the temperature maximum value, the microcontroller operating the heat-dissipation module at full power and reducing a clock throttling-ratio of the microcontroller.

16. The dynamic temperature control method as claimed in claim 10, wherein before rough-tuning the operating power of the heat-dissipation module, if the temperature parameter value is below the temperature minimum value, the microcontroller stopping the operation of the heat-dissipation module.

* * * * *